(No Model.)
A. G. CONWAY.
TOASTER OR BROILER FOR GASOLINE STOVES.
No. 362,939. Patented May 17, 1887.
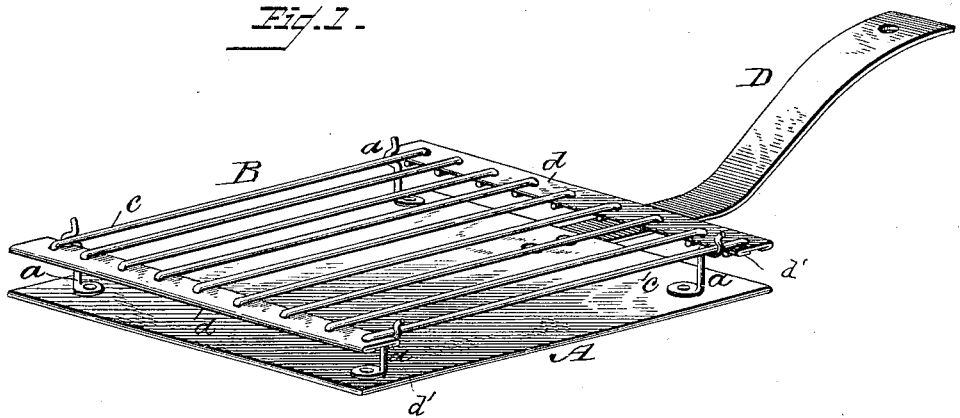
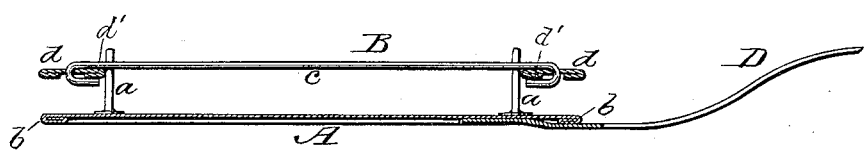
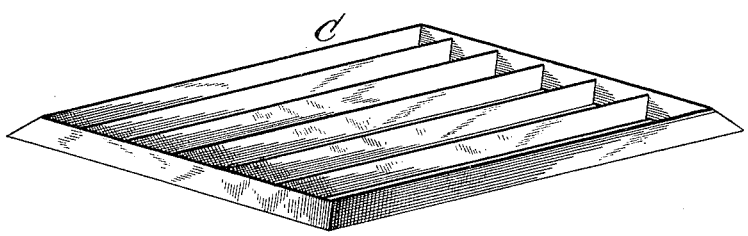
Witnesses
Inventor
Addie G. Conway.
By his Attorney Cha³ H. Fowler

UNITED STATES PATENT OFFICE.

ADDIE GRANT CONWAY, OF KANSAS CITY, MISSOURI.

TOASTER OR BROILER FOR GASOLINE-STOVES.

SPECIFICATION forming part of Letters Patent No. 362,939, dated May 17, 1887.

Application filed October 16, 1886. Serial No. 216,397. (No model.)

To all whom it may concern:

Be it known that I, ADDIE GRANT CONWAY, a citizen of the United States, residing at Kansas City, in the county of Jackson and State of Missouri, have invented certain new and useful Improvements in Toasters or Broilers for Gasoline-Stoves; and I do hereby declare that the following is a full, clear, and exact description of the same, reference being had to the annexed drawings, making a part of this specification, and to the letters and figures of reference marked thereon.

Figure 1 of the drawings is a perspective view of my improved toaster for gasoline-stoves; Fig. 2, a longitudinal section thereof, and Fig. 3 a detail view in perspective of the broiling attachment to take the place of the toaster.

The object of the present invention is to provide a simple and effective device to be used on gasoline-stoves with attachments to adapt the device as a toaster or broiler; and it consists in the details of construction substantially as shown in the drawings, and hereinafter described and claimed.

In the accompanying drawings, A represents the heating plate or base, which is placed over the burner of the stove and is provided with four or more fastening devices, a, to hold thereto, the required distance above said base, the toasting attachment B or broiling attachment C, as desired.

The heating plate or base A is provided with a suitable handle, D, and the edges of the plate or base are beaded, as shown at b, Fig. 2, to strengthen it around its four sides.

The spring fastening devices may be of any preferred construction, so long as they will hold suspended above the plate or base the toaster or broiler attachment and admit of their ready removal for the purpose of using either attachment, as circumstances require. In the present instance I have shown these fastening devices as composed of spring-wire, having an eye at their lower end, by which they are riveted to the plate or base A, and at their upper ends bent so as to form catches to hook over the side edges of the toaster or broiler attachments.

The broiler attachment, as shown in Fig. 3, may be of any suitable form and construction, as may also the toaster B. I prefer, however, to construct the toaster of a series of longitudinal and parallel wires, c, hooked into end braces, d, the latter being composed of sheet metal, which are bent at their edges, as shown, to strengthen them.

The device may be composed of sheet-iron or other suitable metal, and of any size found most preferable, and is equally adapted to open fires as well as gasoline-stoves.

Having now fully described my invention, what I claim as new, and desire to secure by Letters Patent, is—

As an article of manufacture, a combined toaster and broiler, consisting, essentially, of the sheet-metal base-plate A, with its re-enforced edges, the said plate being provided with a handle and with spring-catch standards placed at or near the sides of the base-plate, near the corners thereof, and extending upwardly from its face, and the interchangeable toaster and broiler B and C, adapted to be removably secured in the catches of the spring-catch standards at pleasure, substantially as set forth.

In testimony that I claim the above I have hereunto subscribed my name in the presence of two witnesses.

ADDIE GRANT CONWAY.

Witnesses:
GUS. P. MARTY,
W. W. ARNOLD.